(12) United States Patent
Ren et al.

(10) Patent No.: US 11,224,072 B2
(45) Date of Patent: Jan. 11, 2022

(54) METHOD FOR INFORMATION TRANSMISSION, USER EQUIPMENT AND ACCESS NETWORK ENTITY

(71) Applicant: CHINA ACADEMY OF TELECOMMUNICATIONS TECHNOLOGY, Beijing (CN)

(72) Inventors: Bin Ren, Beijing (CN); Tony Ekpenyong, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/476,015

(22) PCT Filed: Feb. 7, 2018

(86) PCT No.: PCT/CN2018/075575
§ 371 (c)(1),
(2) Date: Jul. 3, 2019

(87) PCT Pub. No.: WO2018/127227
PCT Pub. Date: Jul. 12, 2018

(65) Prior Publication Data
US 2019/0380155 A1 Dec. 12, 2019

(30) Foreign Application Priority Data
Jan. 6, 2017 (CN) .......................... 201710010433.9

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0094* (2013.01); *H04W 72/0453* (2013.01); *H04L 27/2607* (2013.01)

(58) Field of Classification Search
CPC .......... H04W 74/0833; H04W 72/0453; H04L 5/0094; H04L 27/2607; H04L 27/2605;
(Continued)

(56) References Cited

U.S. PATENT DOCUMENTS

2010/0037113 A1 2/2010 Maheshwar et al.
2015/0296539 A1* 10/2015 Guo ..................... H04L 27/261
370/329
(Continued)

FOREIGN PATENT DOCUMENTS

| CN | 102144368 A | 8/2011 |
|---|---|---|
| CN | 104105214 A | 10/2014 |
| WO | 2016114593 A1 | 7/2016 |

OTHER PUBLICATIONS

International Search Report in the international application No. PCT/CN2018/075575, dated Apr. 28, 2018.
(Continued)

*Primary Examiner* — Pao Sinkantarakorn
*Assistant Examiner* — Kabir U Jahangir
(74) *Attorney, Agent, or Firm* — Ladas & Parry, LLP

(57) ABSTRACT

A method for information transmission is provided by the present disclosure. The method includes: transmitting, by a first User Equipment (UE), a first random access request to an access network entity, the first random access request carrying a first preamble and data; and receiving, by the first UE, a random access response sent by the access network entity according to the first random access request.

19 Claims, 8 Drawing Sheets

(51) Int. Cl.
*H04W 72/04* (2009.01)
*H04L 27/26* (2006.01)

(58) Field of Classification Search
CPC ....... H04L 27/2602; C11D 3/00; C11D 3/124; C11D 3/222; C11D 3/3753; C11D 3/505
See application file for complete search history.

(56) References Cited

U.S. PATENT DOCUMENTS

| | | |
|---|---|---|
| 2016/0014815 A1 | 1/2016 | Vajapeyam et al. |
| 2017/0366377 A1* | 12/2017 | Papasakellariou .......................... H04L 27/2613 |
| 2018/0013533 A1 | 1/2018 | Yang et al. |
| 2018/0063794 A1* | 3/2018 | Sanderovich ..... H04W 74/0816 |
| 2018/0077733 A1* | 3/2018 | Wu ........................... H04L 1/00 |
| 2018/0103465 A1* | 4/2018 | Agiwal ............. H04W 72/0413 |
| 2018/0124626 A1* | 5/2018 | Tsai ...................... H04W 24/06 |
| 2019/0014598 A1* | 1/2019 | Yoshimura .......... H04W 74/006 |
| 2019/0342805 A1* | 11/2019 | Hao ...................... H04W 16/28 |
| 2019/0350000 A1* | 11/2019 | Zhang ............... H04W 72/0406 |

OTHER PUBLICATIONS

First Office Action in Chinese Application No. 201710010433.9, dated Dec. 26, 2019.
International Preliminary Report on Patentability in the international Application No. PCT/CN2018/075575, dated Jul. 9, 2019.
3GPP TSG RAN WG1 Meeting #87 R1-1612142, "Considerations on 2-step RACH physical channel design", Nov. 2016.
3GPP TSG RAN WG1 Meeting #87 R1-1611376 "Discussion of Simplified RACH Procedures", Nov. 2016.
Third Office Action in Chinese Application No. 201710010433.9, dated Aug. 15, 2019.
Second Office Action in Chinese Application No. 201710010433.9, dated Jun. 11, 2019.

* cited by examiner

METHOD FOR INFORMATION TRANSMISSION, USER EQUIPMENT AND ACCESS NETWORK ENTITY

CROSS-REFERENCE TO RELATED APPLICATIONS

The present application is the U.S. national phase of PCT Application No. PCT/CN2018/075575 filed on Feb. 7, 2018, which claims priority to Chinese Patent Application No. 201710010433.9 filed in China on Jan. 6, 2017, the entire contents of which are incorporated herein by reference in their entireties.

TECHNICAL FIELD

The present disclosure relates to the technical field of communications, and in particular to a method for information transmission, user equipment and an access network entity.

BACKGROUND

A four-step random access mechanism is adopted in the current long term evolutionary (LTE) protocol. For a next generation of mobile communication system, an uplink multi-beam physical random access channel (PRACH) transmission on a new radio (NR) has a great time delay on a control plane, and thus a performance index of a low time delay defined for a scenario of ultra-reliable and low latency communications cannot be met. It follows that the four-step random access mechanism in the related art has a great time delay.

SUMMARY

An object of the present disclosure is to provide a method for information transmission and an access network entity, to solve the problem in the related art that a four-step random access mechanism has a great time delay.

In order to achieve the above object, embodiments of the present disclosure provides a method for information transmission, including:

transmitting, by a first User Equipment (UE), a first random access request to an access network entity, the first random access request carrying a first preamble and data; and receiving, by the first UE, a random access response sent by the access network entity according to the first random access request.

Optionally, the first preamble and the data are time division multiplexed, and a total power for transmitting each of data symbols of the data is the same as a total power for transmitting any other one of the data symbols of the data.

Optionally, a second random access request sent by a second UE and the first random access request are frequency division multiplexed, the second random access request carrying a second preamble.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between a subcarrier where the first preamble is located and a subcarrier where the data is located; or the first preamble and the data adopt a same subcarrier spacing, the data occupies a plurality of different subcarriers, a subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

Embodiments of the present disclosure provide a method for information transmission, including:

receiving, by an access network entity, a first random access request sent by a first user equipment (UE), the first random access request carrying a first preamble and data; and transmitting, by the access network entity, a random access response to the first UE according to the first random access request.

Optionally, the method further includes:

calculating, by the access network entity, a channel estimation result according to the first preamble; and detecting and demodulating the data by the access network entity according to the channel estimation result.

Optionally, the first preamble and the data are time division multiplexed, and a total power for transmitting each of data symbols of the data is the same as a total power for transmitting any other one of the data symbols of the data.

Optionally, a length of a cyclic prefix of the data is less than a length of a cyclic prefix of the first preamble, and after the receiving, by the access network entity, the first random access request sent by the first UE, the method further includes:

detecting, by the access network entity, the first preamble to obtain a timing offset between the first UE and the access network entity; and determining, by the access network entity, a Fast Fourier Transformation (FFT) processing window for transmitting each of the data symbols of the data according to the timing offset.

Optionally, the method further includes:

receiving, by the access network entity, a second random access request sent by a second UE, the second random access request including a second preamble, and the first random access request and the second random access request being frequency division multiplexed.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between a subcarrier where the first preamble is located and a subcarrier where the data is located; or the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

Embodiments of the present disclosure provide a user equipment (UE), the UE being a first UE and including:

a transmitting module configured to transmit a first random access request to an access network entity, the first random access request carrying a first preamble and data; and a receiving module configured to receive a random access response sent by the access network entity according to the first random access request.

Optionally, the first preamble and the data are time division multiplexed, and a total power for transmitting each of data symbols of the data is the same as a total power for transmitting any other one of the data symbols of the data.

Optionally, a second random access request sent by a second UE and the first random access request are frequency division multiplexed, the second random access request carrying a second preamble.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between a subcarrier where the first preamble is located and a subcarrier where the data is located; or the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

Embodiments of the present disclosure further provide an access network entity, including:

a receiving module configured to receive a first random access request sent by a first UE, the first random access request carrying a first preamble and data; and a transmitting module configured to transmit a random access response to the first UE according to the first random access request.

Optionally, the access network entity further includes:

a calculation module configured to calculate a channel estimation result according to the first preamble; and a demodulation module configured to detect and demodulate the data according to the channel estimation result.

Optionally, the first preamble and the data are time division multiplexed, and a total power for transmitting each of data symbols of the data is the same as a total power for transmitting any other one of the data symbols of the data.

Optionally, a length of a cyclic prefix of the data is less than a length of a cyclic prefix of the first preamble, and the access network entity further includes:

a detection module configured to detect the first preamble to obtain a timing offset between the first UE and the access network entity; and a determination module configured to determine an FFT processing window for transmitting each of the data symbols of the data according to the timing offset.

Optionally, the receiving module is further configured to:

receive a second random access request sent by a second UE, the second access random access request including a second preamble, and the first random access request and the second random access request being frequency division multiplexed.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between a subcarrier where the first preamble is located and a subcarrier where the data is located; or the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

Embodiments of the present disclosure further provide a user equipment (UE) including a processor, a memory and a transceiver, where the processor is configured to read programs from the memory to perform the following operations:

transmitting, through the transceiver, a first random access request to an access network entity, the first random access request carrying a first preamble and data; and receiving, through the transceiver, a random access response sent by the access network entity according to the first random access request, the transceiver is configured to receive and transmit data, and the memory is capable of storing data used by the processor when performing the operations.

Embodiments of the present disclosure further provide an access network entity including a processor, a memory and a transceiver, where the processor is configured to read programs from the memory to perform the following operations:

receiving, through the transceiver, a first random access request sent by a first UE, the first random access request carrying a first preamble and data; and transmitting, through the transceiver, a random access response to the first UE according to the first random access request, the transceiver is configured to receive and transmit data, and the memory is capable of storing data used by the processor when performing the operations.

The technical solutions of the present disclosure have at least the following advantageous effects.

According to the embodiments of the present disclosure, the first UE transmits the first random access request to the access network entity, where the first random access request carries the first preamble and data; and the first UE receives the random access response sent by the access network entity according to the first random access request. In this way, according to the method for information transmission of the present disclosure, the random access request carries both the preamble and the data, thereby effectively reducing a processing delay on a control plane, and increasing reliability of data transmission.

BRIEF DESCRIPTION OF THE DRAWINGS

In order to illustrate the technical solutions of the embodiments of the present disclosure clearer, drawings to be used in describing the embodiments of the present disclosure are introduced briefly hereinafter. Apparently, the drawings described below show only some embodiments of the present disclosure. For those skilled in the art, other drawings may be obtained according to these drawings without creative effort.

DETAILED DESCRIPTION

Technical solutions in the embodiments of the present disclosure will be described clearly and completely hereinafter in connection with the accompanying drawings in the embodiments of the present disclosure. Apparently, the embodiments described are only part of the embodiments of the present disclosure, rather than all of the embodiments. All other embodiments obtained by those skilled in the art based on the embodiments of the present disclosure without creative effort will fall within the protection scope of the present disclosure.

Figures 1, 2:
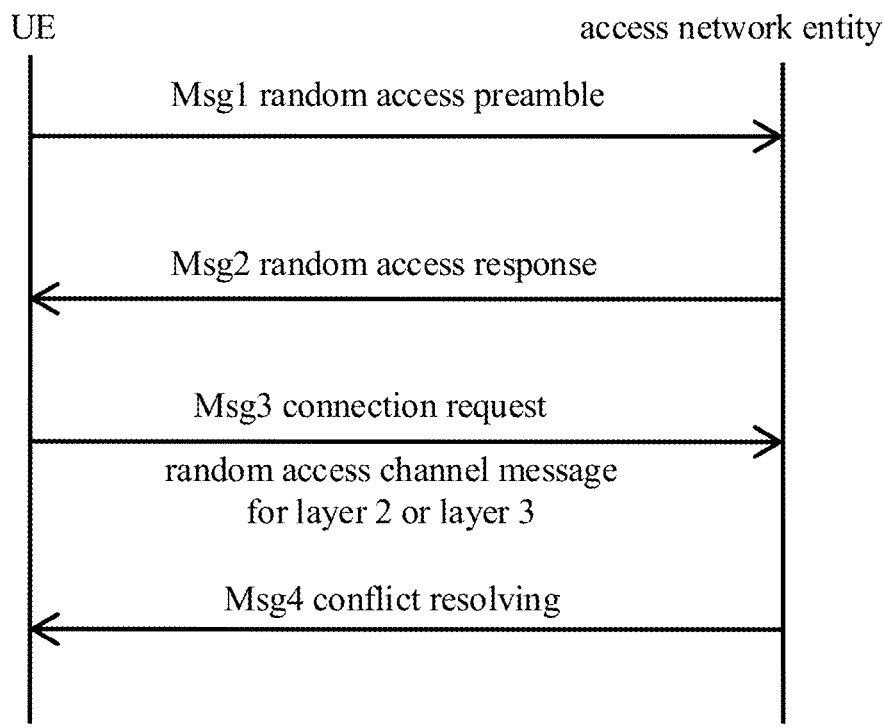
FIG. 1 is a schematic diagram of a four-step random access mechanism according to an embodiment of the present disclosure.
FIG. 2 is a schematic flowchart of a method for information transmission according to an embodiment of the present disclosure.

Reference is made to FIG. 1, which is a schematic diagram of a four-step random access mechanism according to an embodiment of the present disclosure. As shown in FIG. 1, a UE first transmits a random access preamble to an access network entity. The access network entity transmits a random access response to the UE after receiving the random access preamble. The UE transmits a connection request to the access network entity after receiving the random access response. As shown in FIG. 1, the connection request may be a random access channel message sent by a layer 2 or a layer 3. The access network entity resolves a conflict according to the connection request, i.e., establishing a connection between the access network entity and the UE. Based on the access procedure of the four-step random access mechanism, a method for information transmission is provided according to embodiments of the present disclosure.

The UE in the present disclosure may be a terminal device such as a mobile phone, a computer, a household appliance, a tablet personal computer, a laptop computer, a personal digital assistant (PAD), a mobile internet device (MID) or a wearable device. It should be noted that, a specific type of the UE is not limited in the embodiments of the present disclosure. The access network entity may be an entity device connected to the UE in an access network (for example, a base station), and is not limited in the present disclosure.

Reference is made to FIG. 2, which is a schematic flowchart of a method for information transmission according to an embodiment of the present disclosure. As shown in FIG. 2, the method includes the following steps 201 and 202.

In step 201, a first UE transmits a first random access request to an access network entity. The first random access request carries a first preamble and data.

In step 202, the first UE receives a random access response sent by the access network entity according to the first random access request.

In the embodiment, the first UE transmits the first random access request to the access network entity when it requests access. The first random access request carries a first preamble and data. That is, when the first UE needs to request access, the first UE transmits both the first preamble and the data to the access network entity. It should be noted that in the present embodiment, the first UE is named only to distinguish from other UEs hereinafter, and is not limited in the present disclosure.

The data may be an access request message, that is, contents included in Msg3 shown in FIG. 1 (such as a UE identification code, an uplink scheduling request (SR), or a small data packet). That is, in the method of the embodiment, contents included in MSg1 and Msg3 in the four-step random access mechanism shown in FIG. 1 are transmitted altogether to the access network entity, thereby effectively reducing a transmission delay between the first preamble and the data, and improving a transmission efficiency.

Figure 3:
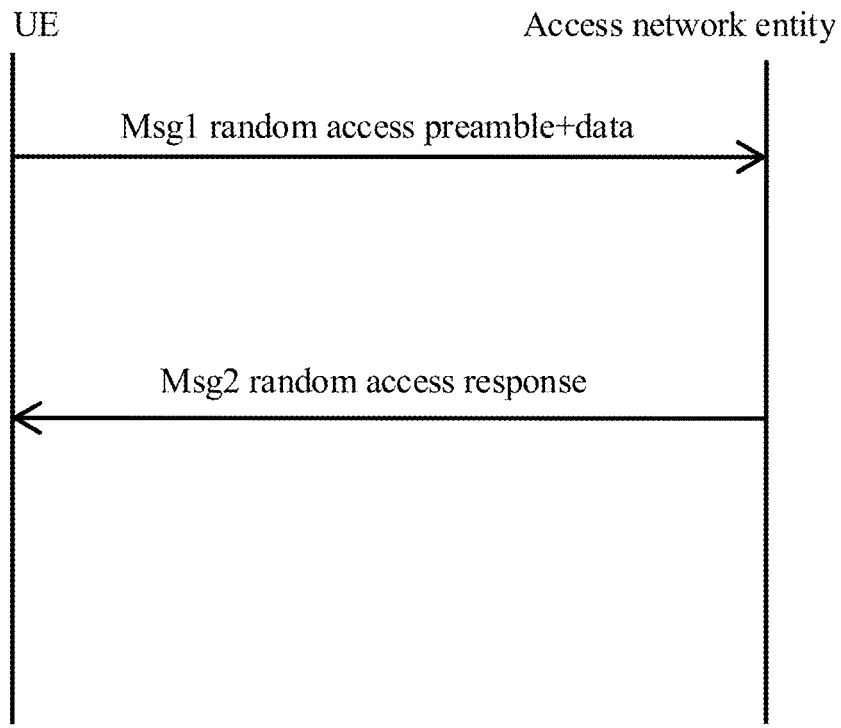
FIG. 3 is a schematic diagram of a two-step random access mechanism according to an embodiment of the present disclosure.

As shown in FIG. 3, after receiving the first random access request, the access network entity transmits a random access response to the first UE according to the first random access request. The random access response may include an identification code, a timing advance (TA) command, or a UE identification code for resolving a conflict. That is, in the method of the present disclosure, the four-step random access mechanism shown in FIG. 1 is simplified into the two-step random access mechanism shown in FIG. 3, thereby effectively reducing a processing delay on the control plane.

The first preamble and the data may be time division multiplexed (TDM), or may be frequency division multiplexed (FDM). The data may have a multi-carrier waveform or a single-carrier waveform. A length of the first preamble may be the same as or different from a length of the data. A length of a cyclic prefix (CP) of the first preamble may be the same as or different from a length of a cyclic prefix of the data. The first preamble may include one preamble sequence (such as a long preamble sequence) or a plurality of preamble sequences (such as a plurality of short preamble sequences).

The first preamble and the data may occupy one time slot, or a plurality of time slots. In the embodiment of the present disclosure, the first preamble and the data may occupy different time slots respectively.

In some embodiments of the present disclosure, when the first UE transmits the first random access request to the access network entity, a second random access request sent by another UE (such as a second UE) and the first random access request may be time division multiplexed. The second random access request may include only a second preamble, that is, only Msg1 shown in FIG. 1 is transmitted; or the second random access request may include both the second preamble and the data.

In some embodiments of the present disclosure, in a case that the first preamble and the data are time division multiplexed and a length of the CP of the data is less than a length of the CP of the first preamble, the access network entity may detect the data in the following manner. Firstly, based on the first preamble, the access network entity obtains a timing offset between the first UE and the access network entity; and after the timing offset is determined, the access network entity determines a fast Fourier transformation (FFT) processing window for transmitting each data symbol of the data according to the timing offset, so as to process the data.

It should be understood that the access network entity may calculate a channel estimation result according to the first preamble after receiving the first random access request, and then detect and demodulate the data according to the channel estimation result.

Optionally, the first preamble and the data are time division multiplexed, and a total power for transmitting each of data symbols of the data is the same as a total power for transmitting any other one of the data symbols of the data.

In the embodiment, the first preamble and the data are time division multiplexed. Referring to FIG. 4 to FIG. 10, the first preamble and the data may occupy only one time slot (shown in FIG. 4 to FIG. 7), or may occupy a plurality of time slots (shown in FIG. 8 to FIG. 10). In the embodiment, a total power for transmitting each of data symbols of the data is the same as a total power for transmitting any other one of the data symbols of the data.

A length of the first preamble may be the same as or different from a length of the data. A length of a cyclic prefix of the first preamble may be the same as or different from a length of a cyclic prefix of the data. The first preamble may include one preamble sequence, or a plurality of preamble sequences.

Figure 4:
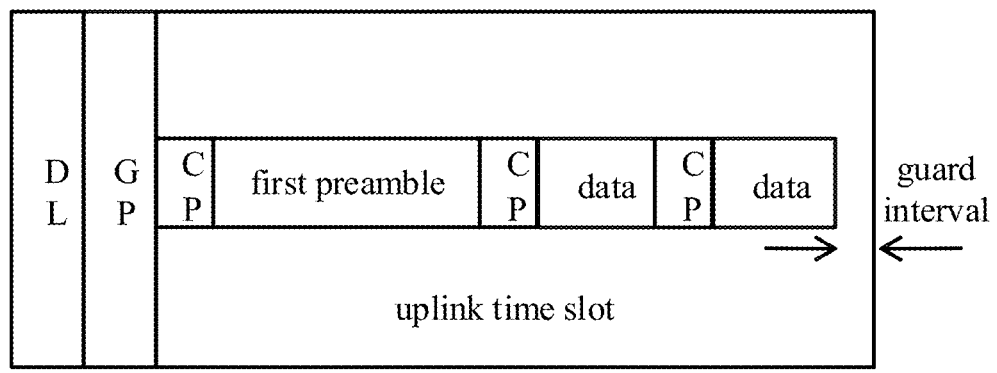
FIG. 4 is a schematic diagram showing multiplexing of a preamble and data according to an embodiment of the present disclosure.

In the schematic multiplexing diagram shown in FIG. 4, the first preamble includes one preamble sequence, the length of the first preamble is different from the length of the data, and the length of the cyclic prefix of the first preamble is different from the length of the cyclic prefix of the data.

Figure 5:
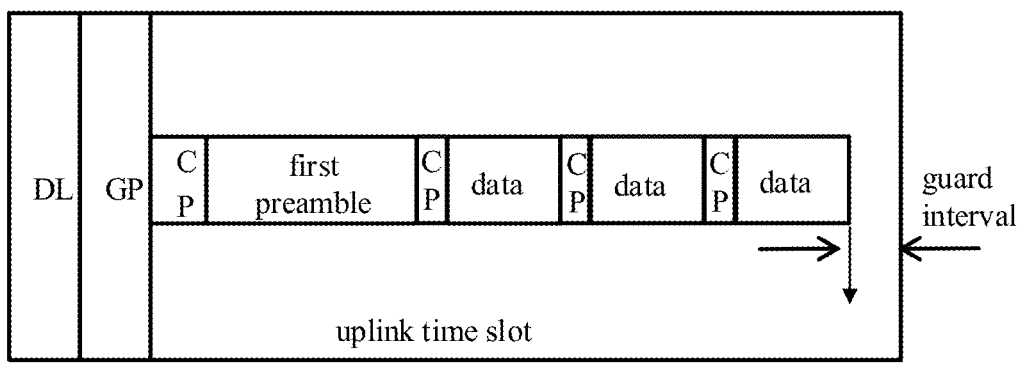
FIG. 5 is a schematic diagram showing multiplexing of another preamble and data according to an embodiment of the present disclosure.
Figure 6:
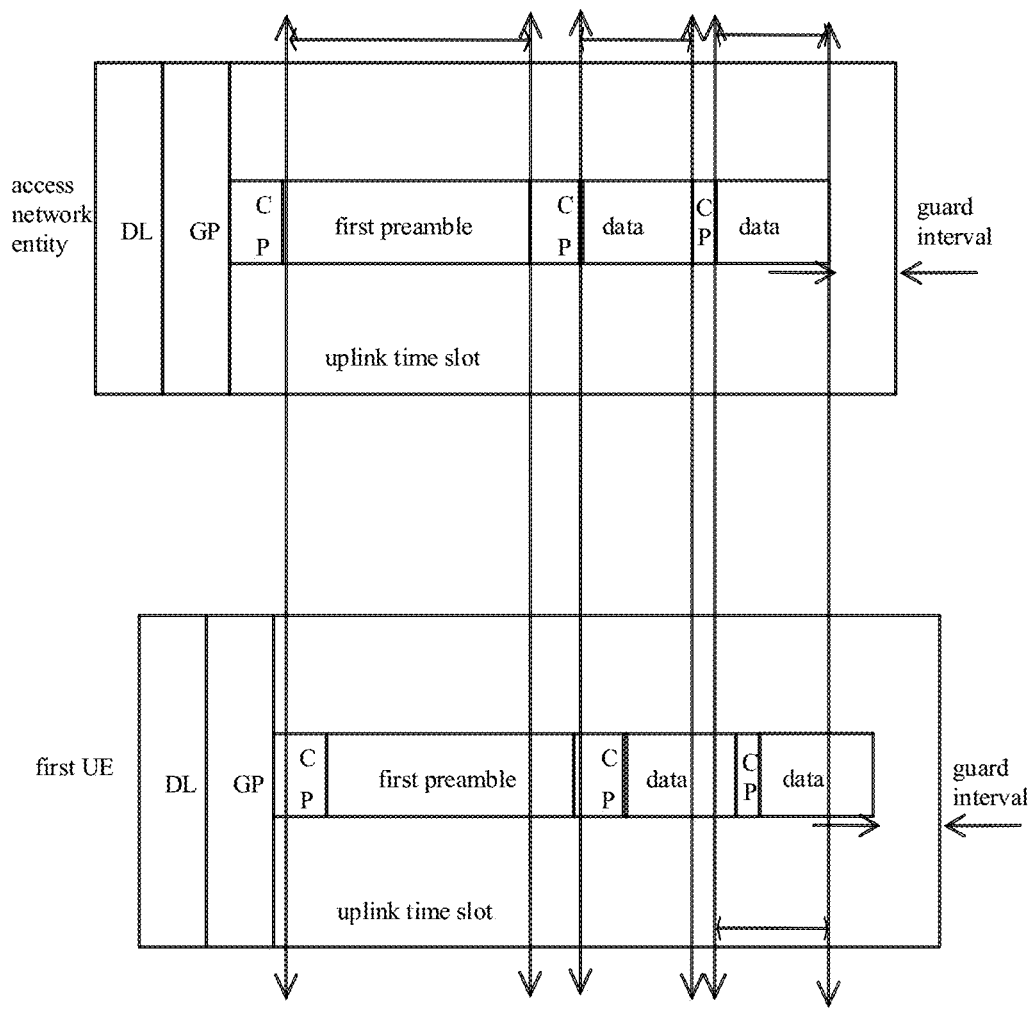
FIG. 6 is a schematic diagram showing multiplexing of another preamble and data according to an embodiment of the present disclosure.

In the schematic multiplexing diagram shown in FIG. 5, the first preamble includes one preamble sequence, the length of the first preamble is different from the length of the data, and the length of the cyclic prefix of the first preamble is different from the length of the cyclic prefix of the data. As shown in FIG. 5, the length of the cyclic prefix of the first preamble is greater than the length of the cyclic prefix of the data. In the embodiment, when the first random access request is received by the access network entity, the access network entity detects the data symbol in the following manner. Firstly, the access network entity detects the first preamble to obtain a timing offset between the first UE and the access network entity at this point; and then determines an FFT processing window for transmitting each data symbol of the data based on the timing offset. As shown in FIG. 6, the timing offset is a sum of a round trip transmission delay RTT between the access network entity and the first UE, and a delay spread of a transmission channel.

Figure 7:
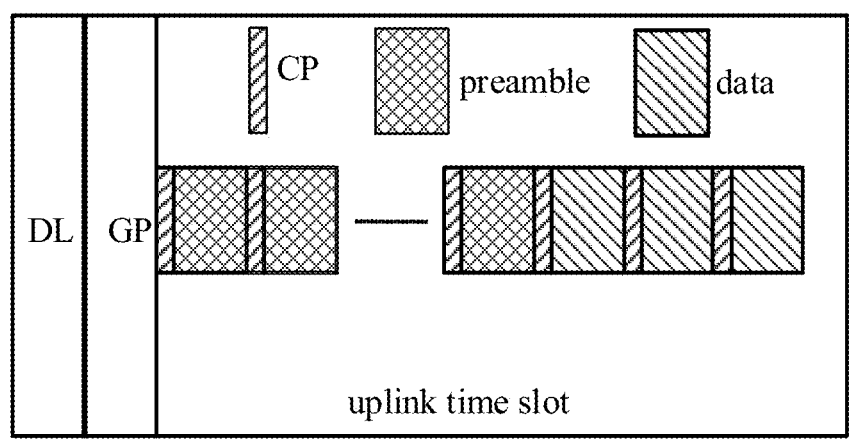
FIG. 7 is a schematic diagram showing multiplexing of another preamble and data according to an embodiment of the present disclosure.

In the schematic multiplexing diagram shown in FIG. 7, the first preamble includes a plurality of preamble sequences. The first UE may independently select each preamble sequence. In this way, the multiplexing structure shown in FIG. 7 can carry more data.

Figure 8:
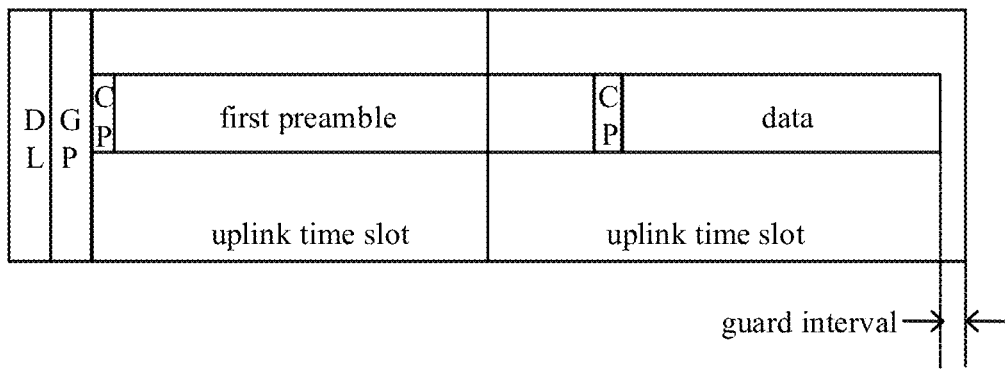
FIG. 8 is a schematic diagram showing multiplexing of another preamble and data according to an embodiment of the present disclosure.
Figure 9:
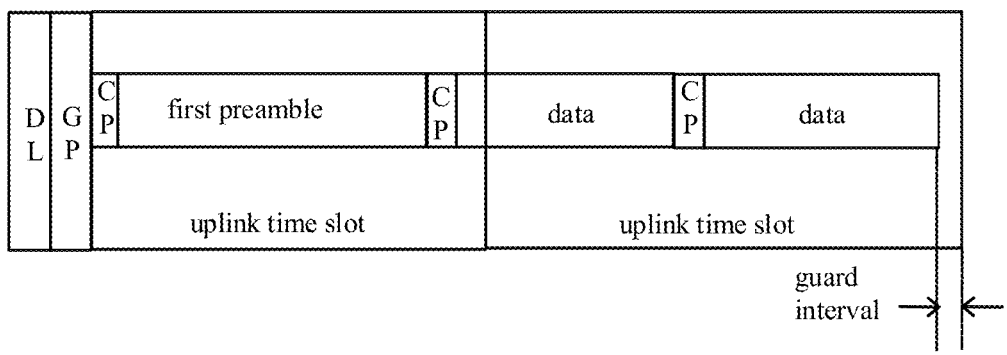
FIG. 9 is a schematic diagram showing multiplexing of another preamble and data according to an embodiment of the present disclosure.

In a case that the first preamble and the data occupy a plurality of time slots, the first preamble may span a plurality of time slots and the data may occupy only one time slot, as shown in FIG. 8. It should be understood that, the first preamble may occupy only one time slot, and the data may span a plurality of time slots, as shown in FIG. 9. Also, the first preamble and the data may occupy a plurality of time slots respectively.

Figure 10:
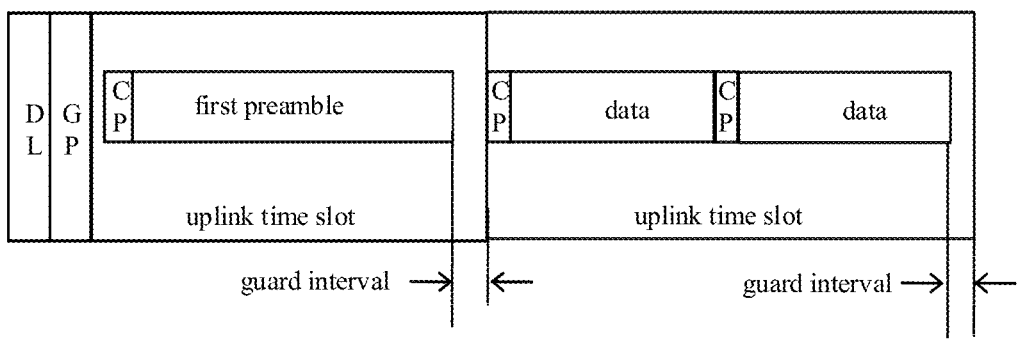
FIG. 10 is a schematic diagram showing multiplexing of another preamble and data according to an embodiment of the present disclosure.

In some embodiments of the present disclosure, the first preamble and the data occupy different time slots respectively, as shown in FIG. 10. In the embodiment of the present disclosure, at least one time slot of one or more time slots occupied by the first preamble and the data may reserve a guard spacing, thereby facilitating multiplexing the guard spacing by another UE.

Optionally, a second random access request sent by a second UE and the first random access request are frequency division multiplexed. The second random access request carries a second preamble.

Figure 11:
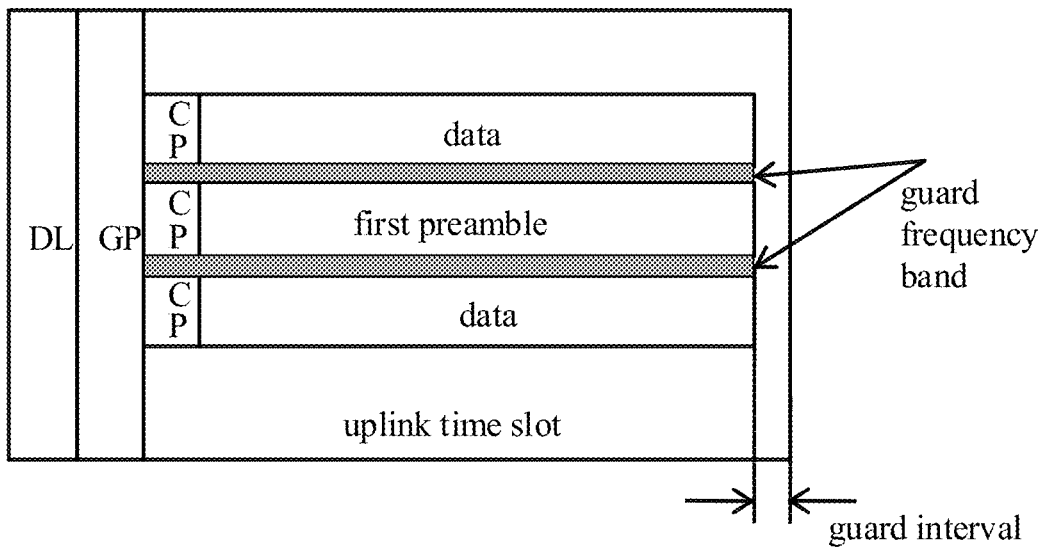
FIG. 11 is a schematic diagram showing multiplexing of another preamble and data according to an embodiment of the present disclosure.

In the embodiment, the first random access request and the second random access request are frequency division multiplexed. The second random access request is a request sent by the second UE, and the second random access request carries the second preamble. That is, as shown in FIG. 11, in the embodiment, the first preamble and the data are time division multiplexed, and the first random access request and the second random access request are frequency division multiplexed.

Optionally, the first preamble and the data are frequency division multiplexed, and a power of the first preamble is the same as a total power for transmitting data symbols of the data.

Figure 12:
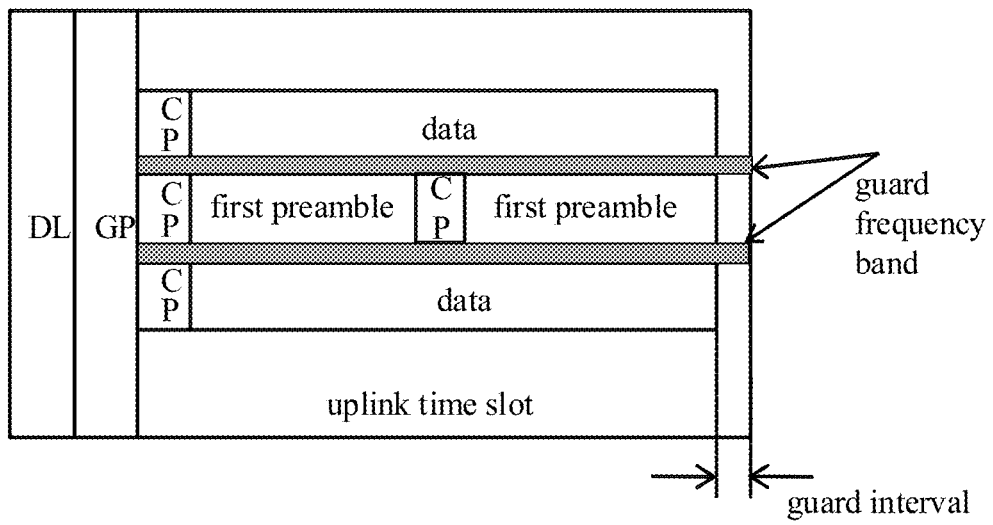
FIG. 12 is a schematic diagram showing multiplexing of another preamble and data according to an embodiment of the present disclosure.
Figure 13:
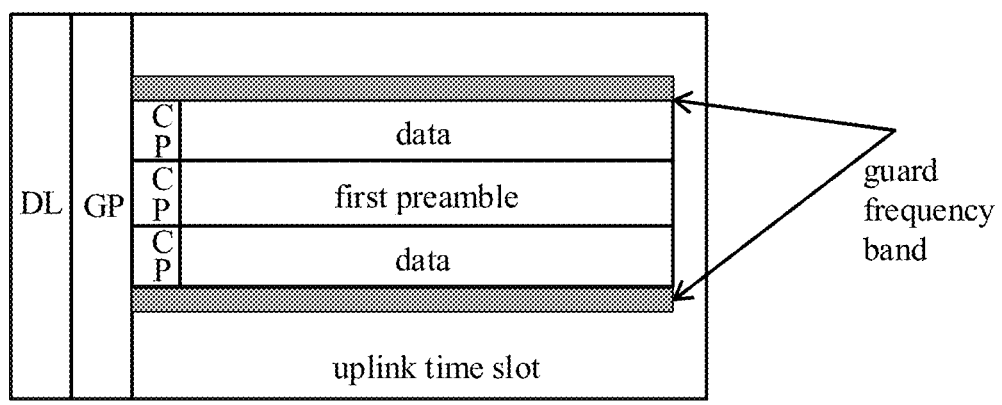
FIG. 13 is a schematic diagram showing multiplexing of another preamble and data according to an embodiment of the present disclosure.
Figure 14:
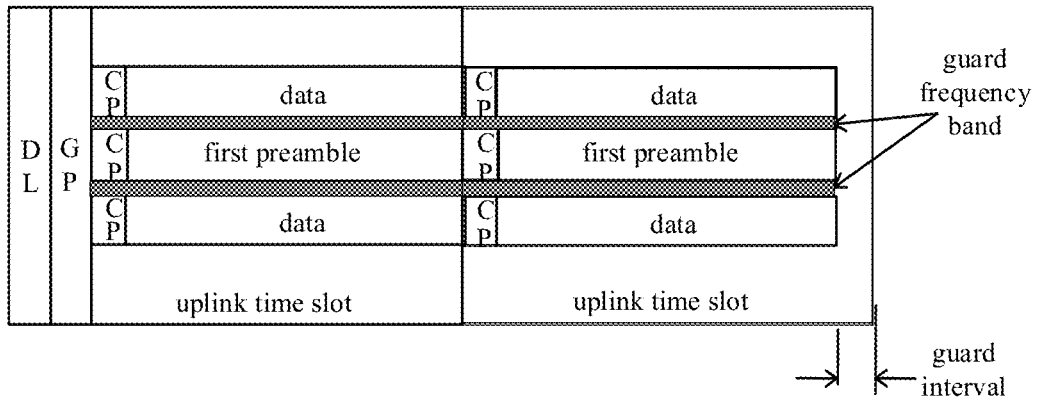
FIG. 14 is a schematic diagram showing multiplexing of another preamble and data according to an embodiment of the present disclosure.
Figure 15:
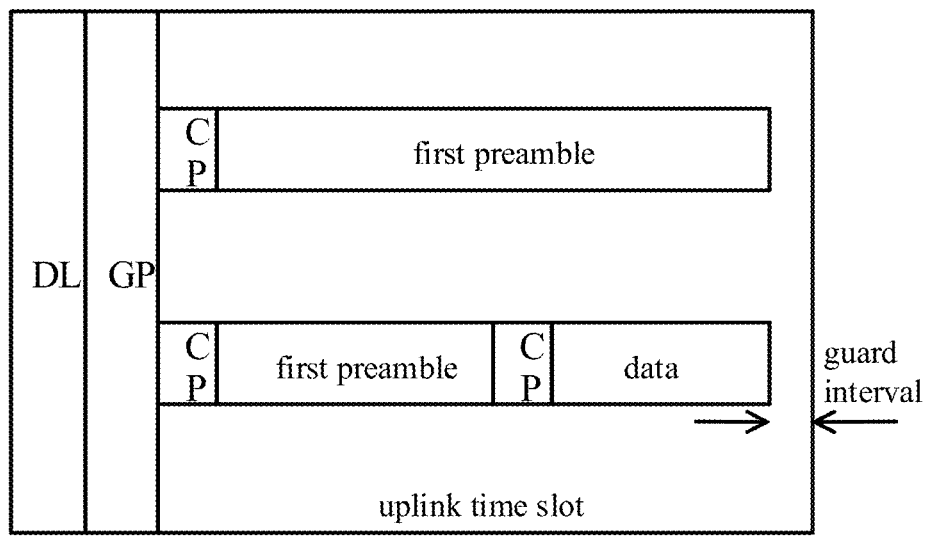
FIG. 15 is a schematic diagram showing multiplexing of another preamble and data according to an embodiment of the present disclosure.

In the embodiment, the first preamble and the data are frequency division multiplexed. As shown in FIG. 12 to FIG. 15, a plurality of manners of frequency division multiplexing of the first preamble and the data are shown. In the embodiment, the first preamble and the data may adopt a same subcarrier spacing, or may adopt different subcarrier spacings. In some embodiments of the present disclosure, a guard frequency band may also be included between a plurality of different subcarriers. It should be noted in a case that the first preamble and the data are frequency division multiplexed, the first preamble and the data may occupy only one time slot, as shown in FIG. 12 to FIG. 14, for example. It should be understood that, the first preamble and the data may occupy a plurality of time slots, as shown in FIG. 15, for example.

Optionally, the first preamble and the data adopt different subcarrier spacings, and a guard frequency band is included between the subcarrier where the first preamble is located and the subcarrier where the data is located.

Alternatively, the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

In the embodiment, the first preamble and the data may adopt different subcarrier spacings, or may adopt a same subcarrier spacing. Specifically, in a case that the first preamble and the data adopt different subcarrier spacings, a guard frequency band is included between the subcarrier where the first preamble is located and the subcarrier where the data is located, as shown in FIG. 11. In addition, as shown in FIG. 12, the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the subcarriers where the data is located.

Optionally, the first preamble includes one or more preamble sequences, and the first preamble and the data occupy one or more time slots.

The data has a multi-carrier waveform or a single-carrier waveform.

A length of the first preamble is the same as or different from a length of the data.

A length of a cyclic prefix of the first preamble is the same as or different from a length of a cyclic prefix of the data.

In the embodiment, the first preamble may include only one preamble sequence (such as one long preamble sequence), or may include a plurality of preamble sequences (such as a plurality of short preamble sequences). The first preamble and the data may occupy only one time slot, or may occupy a plurality of time slots. The data may have a multi-carrier waveform (such as orthogonal frequency division multiplexing, OFDM), or a single-carrier waveform (such as discrete Fourier transform-spread (DFT-S)-OFDM). A length of the first preamble may be the same as or different from a length of the data, and a length of a cyclic prefix of the first preamble may be the same as or different from a length of a cyclic prefix of the data.

Optionally, the first preamble and the data occupy different time slots respectively.

In the embodiment, in a case that the first preamble and the data are time division multiplexed, the first preamble and the data occupy different time slots respectively. That is, in the embodiment, the first preamble and the data include have no time slot in common, as shown in FIG. 10.

Optionally, at least one time slot of one or more time slots occupied by the first preamble and the data reserve a guard spacing.

In the method of the embodiment, a guard spacing is reserved in at least one time slot of one or more time slots occupied by the first preamble and the data, and the guard spacing is used for multiplexing by another UE. Specifically, in a case that the first preamble and the data occupy only one time slot, the guard spacing may be reserved in the shared time slot. In a case that the first preamble and the data occupy a plurality of time slots, the guard spacing may be reserved in the time slot occupied by the first preamble, and no guard spacing is reserved in the time slot occupied by the data. Of course, the guard spacing may be reserved in the time slot where the data is located, and no guard spacing is reserved in the time slot where the first preamble is located, as shown in FIG. 9. In a case that the first preamble and the data occupy different time slots respectively, a guard spacing may be respectively reserved in different time slots occupied by the first preamble and the data according to the method, as shown in FIG. 10. It should be noted that, the reservation of the guard spacing in the embodiment of the present disclosure is not only applicable to the case that the first preamble and the data are time division multiplexed, but also is applicable to the case that the first preamble and the data are frequency division multiplexed, as shown in FIG. 12 to FIG. 15.

It should be noted that all the time slots described above refer to uplink time slots. In the multiplexing structural diagrams shown in FIG. 4 to FIG. 15, DL indicates a downlink time slot, and GP indicates a guard period.

According to the embodiment of the present disclosure, the first UE transmits the first random access request to the access network entity, where the first random access request carries the first preamble and the data; and the first UE receives the random access response sent by the access network entity according to the first random access request. In this way, according to the method for information transmission of the present disclosure, the random access request carries both the preamble and the data, thereby effectively reducing a processing delay on the control plane and increasing the reliability of data transmission.

Figure 16:
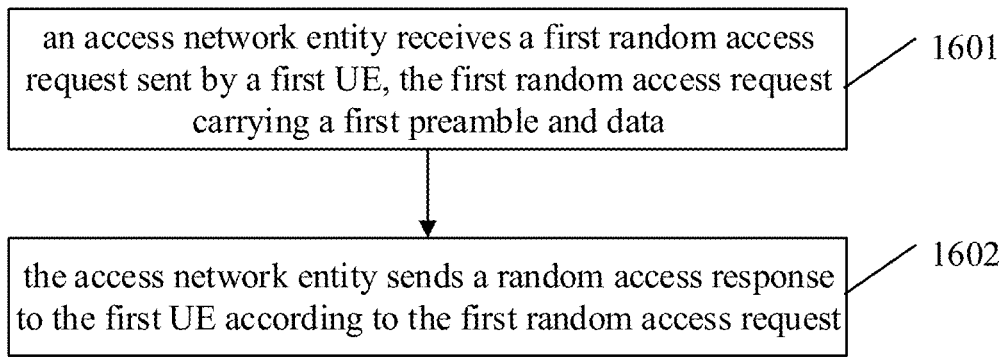
FIG. 16 is a schematic flowchart of another method for information transmission according to an embodiment of the present disclosure.

Reference is made to FIG. 16, which is a schematic flowchart of another method for information transmission according to an embodiment of the present disclosure. As shown in FIG. 16, the method includes the following steps 1601 and 1602.

In step 1601, an access network entity receives a first random access request sent by a first UE. The first random access request carries a first preamble and data.

In step 1602, the access network entity transmits a random access response to the first UE according to the first random access request.

Optionally, the method further includes:

calculating, by the access network entity, a channel estimation result according to the first preamble; and detecting and demodulating the data by the access network entity according to the channel estimation result.

Optionally, the first preamble and the data are time division multiplexed, and a total power for transmitting each of data symbols of the data is the same as a total power for transmitting any other one of the data symbols of the data.

Optionally, a length of a cyclic prefix of the data is less than a length of a cyclic prefix of the first preamble. After the access network entity receives the first random access request sent by the first UE, the method further includes:

detecting, by the access network entity, the first preamble to obtain a timing offset between the first UE and the access network entity; and determining, by the access network entity, a Fast Fourier Transformation (FFT) processing window for transmitting each of the data symbols of the data according to the timing offset.

Optionally, the method further includes:

receiving, by the access network entity, a second random access request sent by a second UE, the second random access request including a second preamble, and the first random access request and the second random access request being frequency division multiplexed.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between a subcarrier where the first preamble is located and a subcarrier where the data is located.

Alternatively, the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences; and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

It should be noted that the present embodiment may be an embodiment of access network entity corresponding to the embodiment shown in FIG. 2. For related steps executed by the access network entity, reference may be made to related description in the embodiment shown in FIG. 2, and details are not described herein. The access network entity may be a base station, which is not limited herein.

Figure 17:
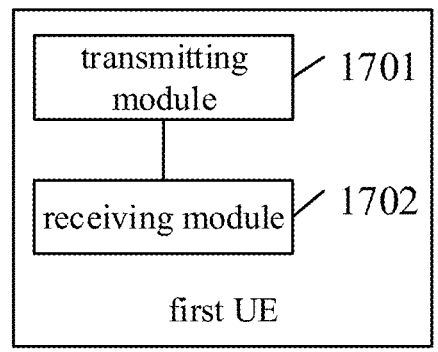
FIG. 17 is a schematic structural diagram of a first UE according to an embodiment of the present disclosure.

Reference is made to FIG. 17, which is a schematic structural diagram of a first UE according to an embodiment of the present disclosure. As shown in FIG. 17, the first UE includes a transmitting module 1701 and a receiving module 1702.

The transmitting module 1701 is configured to transmit a first random access request to an access network entity. The first random access request carries a first preamble and data.

The receiving module 1702 is configured to receive a random access response sent by the access network entity according to the first random access request.

Optionally, the first preamble and the data are time division multiplexed, and a total power for transmitting each of data symbols of the data is the same as a total power for transmitting any other one of the data symbols of the data.

Optionally, a second random access request sent by a second UE and the first random access request are frequency division multiplexed, the second random access request carrying a second preamble.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between the subcarrier where the first preamble is located and the subcarrier where the data is located.

Alternatively, the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

It should be noted that, the first UE in the present embodiment may be the first UE in the embodiments shown in FIG. 2 to FIG. 16, any implementation of the first UE in the embodiments shown in FIG. 2 to FIG. 16 may be realized by the first UE in the present embodiment and the same advantageous effects can be achieved, and details are not described herein.

Figure 18:
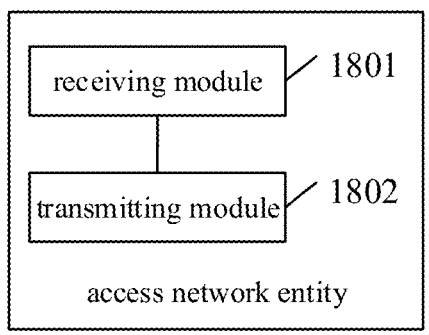
FIG. 18 is a schematic structural diagram of an access network entity according to an embodiment of the present disclosure.

Reference is made to FIG. 18, which is a schematic structural diagram of an access network entity according to an embodiment of the present disclosure. As shown in FIG. 18, the access network entity includes a receiving module 1801 and a transmitting module 1802.

The receiving module 1801 is configured to receive a first random access request sent by the first UE. The first random access request carries a first preamble and data.

The transmitting module 1802 is configured to transmit a random access response to the first UE according to the first random access request.

Figure 19:
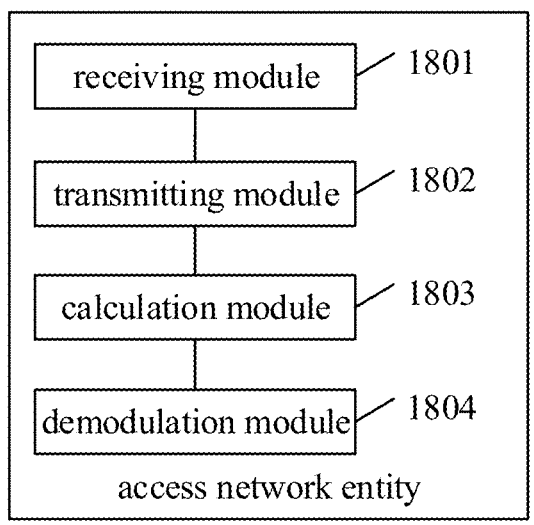
FIG. 19 is a schematic structural diagram of another access network entity according to an embodiment of the present disclosure.

Optionally, reference is made to FIG. 19, which is a schematic structural diagram of another access network entity according to an embodiment of the present disclosure. As shown in FIG. 19, the access network entity further includes a calculation module 1803 and a demodulation module 1804.

The calculation module 1803 is configured to calculate a channel estimation result according to the first preamble.

The demodulation module 1804 is configured to detect and demodulate the data according to the channel estimation result.

Optionally, the first preamble and the data are time division multiplexed, and a total power for transmitting each of data symbols of the data is the same as a total power for transmitting any other one of the data symbols of the data.

Figure 20:
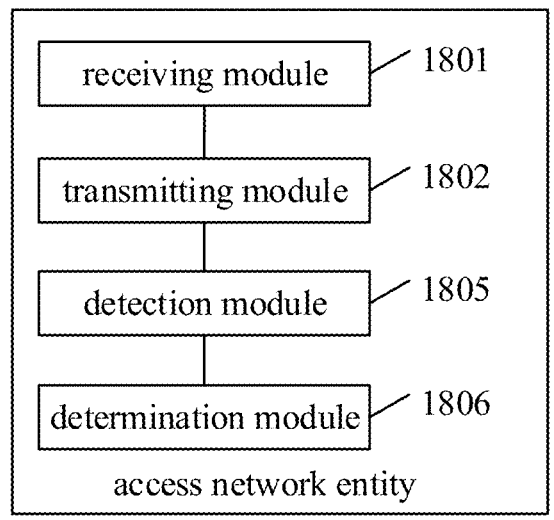
FIG. 20 is a schematic structural diagram of another access network entity according to an embodiment of the present disclosure.

Optionally, reference is made to FIG. 20, which is a schematic structural diagram of another access network entity according to an embodiment of the present disclosure. As shown in FIG. 20, a length of a cyclic prefix of the data is less than a length of a cyclic prefix of the first preamble, and the access network entity further includes: a detection module 1805 and a determination module 1806.

The detection module 1805 is configured to detect the first preamble to obtain a timing offset between the first UE and the access network entity.

The determination module 1806 is configured to determine an FFT processing window for transmitting each of the data symbols of the data according to the timing offset.

Optionally, the receiving module is further configured to:

receive a second random access request sent by a second UE. The second random access request includes a second preamble, and the first random access request and the second random access request are frequency division multiplexed.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between the subcarrier where the first preamble is located and the subcarrier where the data is located.

Alternatively, the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

It should be noted that, the access network entity in the present embodiment may be the access network entity in the embodiments shown in FIG. 2 to FIG. 16, any implementation of the access network entity in the embodiments shown in FIG. 2 to FIG. 16 may be realized by the access network entity in the present embodiment and the same advantageous effects can be achieved, and details are not described herein.

Figure 21:
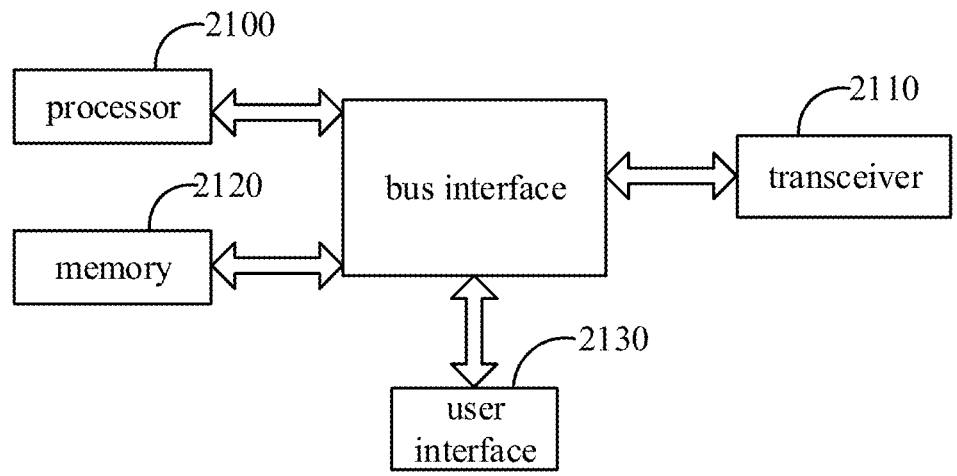
FIG. 21 is a schematic structural diagram of another first UE according to an embodiment of the present disclosure.

Reference is made to FIG. 21, which is a schematic structural diagram of a first UE according to an embodiment of the present disclosure. As shown in FIG. 21, the first UE includes: a processor 2100, a transceiver 2110, a memory 2120, a user interface 2130 and a bus interface.

The processor 2100 is configured to read programs from the memory 2120 to perform the following operations:

transmitting a first random access request to an access network entity, the first random access request carrying a first preamble and data; and receiving a random access response sent by the access network entity according to the first random access request.

The transceiver 2110 is configured to receive and transmit data under the control of the processor 2100.

In FIG. 21, a bus architecture may include any number of interconnected buses and bridges, and specifically links one or more processors represented by the processor 2100 and various circuits of a memory represented by the memory 2120 together. The bus architecture may also link various other circuits together, such as peripherals, voltage regulators, and power management circuits. The bus interface provides an interface. The transceiver 2110 may include a plurality of elements, that is, including a transmitter and a receiver, providing units for communicating with various other devices on a transmission medium. For different user equipment, the user interface 2130 may also be an interface for connection with a required device internally and externally, and the connected device includes but is not limited to a keypad, a display, a speaker, a microphone and a joystick.

The processor 2100 is responsible for managing the bus architecture and performing normal processing, and the memory 2120 may store data used by the processor 2100 when performing the operations.

Optionally, the first preamble and the data are time division multiplexed, and a total power for transmitting each of data symbols of the data is the same as a total power for transmitting any other one of the data symbols of the data.

Optionally, a second random access request sent by a second UE and the first random access request are frequency division multiplexed, the second random access request carrying a second preamble.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between a subcarrier where the first preamble is located and a subcarrier where the data is located.

Alternatively, the first preamble and the data adopt a same subcarrier spacing, the data occupies a plurality of different subcarriers, a subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

It should be noted that the first UE in the present embodiment may be the first UE in the embodiments shown in FIG. 2 to FIG. 16, any implementation of the first UE in the embodiments shown in FIG. 2 to FIG. 16 may be realized by the first UE in the present embodiment and the same advantageous effects can be achieved, and details are not described herein.

Figure 22:
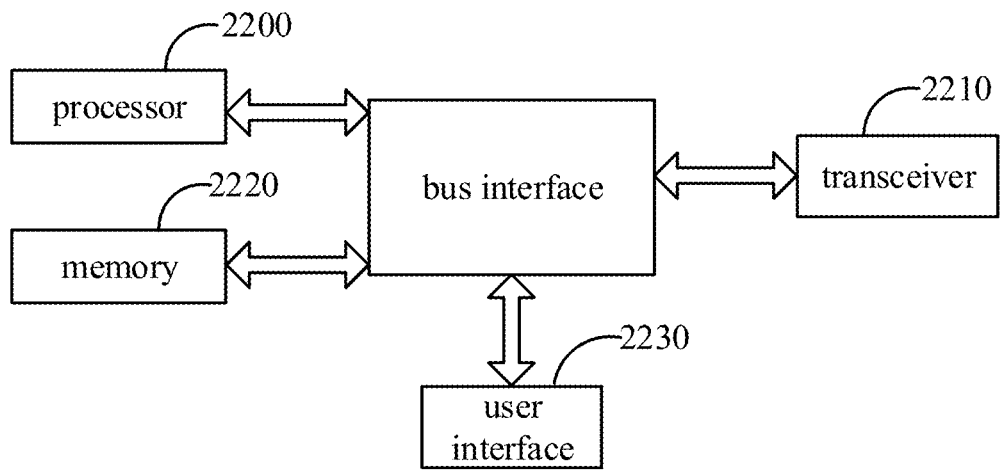
FIG. 22 is a schematic structural diagram of another access network entity according to an embodiment of the present disclosure.

Reference is made to FIG. 22, which is a structural diagram of an access network entity. The access network entity includes: a processor 2200, a transceiver 2210, a memory 2220, a user interface 2230 and a bus interface.

The processor 2200 is configured to read programs from the memory 2220 to perform the following operations:

receiving a first random access request sent by a first UE, the first random access request carrying a first preamble and data; and transmitting a random access response to the first UE according to the first random access request.

In FIG. 22, a bus architecture may include any number of interconnected buses and bridges, and specifically links one or more processors represented by the processor 2200 and various circuits of a memory represented by the memory 2220 together. The bus architecture may also link various other circuits together, such as peripherals, voltage regulators, and power management circuits. The bus interface provides an interface. The transceiver 2210 may include a plurality of elements, that is, including a transmitter and a receiver, providing units for communicating with various other devices on a transmission medium. The processor 2200 is responsible for managing the bus architecture and performing normal processing, and the memory 2220 may store data used by the processor 2200 when performing the operations.

The processor 2200 is responsible for managing the bus architecture and performing normal processing, and the memory 2220 may store data used by the processor 2200 when performing the operations.

Optionally, the processor 2200 is further configured to:

calculate a channel estimation result according to the first preamble; and detect and demodulate the data according to the channel estimation result.

Optionally, the first preamble and the data are time division multiplexed, and a total power for transmitting each of data symbols of the data is the same as a total power for transmitting any other one of the data symbols of the data.

Optionally, a length of a cyclic prefix of the data is less than a length of a cyclic prefix of the first preamble. After the access network entity receives the first random access request sent by the first UE, the processor 2200 is further configured to:

detect the first preamble to obtain a timing offset between the first UE and the access network entity; and determine an FFT processing window for transmitting each of the data symbols of the data according to the timing offset.

Optionally, the processor 2200 is further configured to:

receive a second random access request sent by the second UE. The second random access request includes a second preamble, and the first random access request and the second random access request are frequency division multiplexed.

Optionally, the first preamble and the data are frequency division multiplexed, and a power of the first preamble is the same as a total power for transmitting data symbols of the data.

Optionally, the first preamble and the data adopt different subcarrier spacings, and a guard frequency band is included between the subcarrier where the first preamble is located and the subcarrier where the data is located.

Alternatively, the first preamble and the data adopt a same subcarrier spacing, the data occupies a plurality of different subcarriers, the subcarrier where the preamble is located is arranged in the center of the plurality of subcarriers where the data is located, and a guard frequency band is included at both the outermost sides of the plurality of subcarriers where the data is located.

Optionally, the first preamble includes one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data.

Optionally, the first preamble and the data respectively occupy different time slots.

Optionally, at least one time slot of one or more time slots occupied by the first preamble and the data reserves a guard spacing.

It should be noted that the access network entity in the present embodiment may be the access network entity in the embodiments shown in FIG. 2 to FIG. 16, and any implementation of the access network entity in the embodiments shown in FIG. 2 to FIG. 16 may be realized by the access network entity in the present embodiment and the same advantageous effects can be achieved, and details are not described herein.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, a plurality of units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of hardware plus software functional units.

The above described integrated unit implemented in the form of a software functional unit can be stored in a computer readable storage medium. The software functional unit is stored in a storage medium which includes a plurality of instructions for causing a computer device (which may be a personal computer, a server, or a network device, etc.) to execute all or part of the steps of the methods of the various embodiments of the present disclosure. The foregoing storage medium includes: a U disk, a mobile hard disk, a Read-Only Memory (ROM), a Random Access Memory (RAM), a magnetic disk or an optical disk, and various media that can store program codes thereon.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A method for information transmission, comprising:
    transmitting, by a first User Equipment (UE), a first random access request to an access network entity, wherein the first random access request carries a first preamble and data; and
    receiving, by the first UE, a random access response sent by the access network entity according to the first random access request,
    wherein at least one time slot occupied by the first preamble reserves a guard interval, and the reserved guard interval of the first preamble is used to be multiplexed by a UE other than the first UE,
    wherein the first preamble and the data are time division multiplexed, and a total power for transmitting each of data symbols of the data is the same as a total power for transmitting any other one of the data symbols of the data; or
    the first preamble and the data are frequency division multiplexed, and a power of the first preamble is the same as a total power for transmitting data symbols of the data.

2. The method according to claim 1, wherein a second random access request sent by a second UE and the first random access request are frequency division multiplexed, wherein the second random access request carries a second preamble.

3. The method according to claim 1, wherein in a case that the first preamble and the data are frequency division multiplexed,
    the first preamble and the data adopt different subcarrier spacings, and a guard frequency band is comprised between a plurality of subcarriers where the first preamble is located and a plurality of subcarriers where the data is located; or
    the first preamble and the data adopt a same subcarrier spacing, the data occupies a plurality of different subcarriers, the plurality of subcarriers where the first preamble is located is arranged in the center of the plurality of subcarriers where the data is located, and a guard frequency band is comprised at both the outermost sides of the plurality of subcarriers where the data is located.

4. The method according to claim 1, wherein the first preamble comprises one or more preamble sequences, and the first preamble and the data occupy one or more time slots;
    the data has a multi-carrier waveform or a single-carrier waveform;
    a length of the first preamble is the same as or different from a length of the data; and
    a length of a cyclic prefix of the first preamble is the same as or different from a length of a cyclic prefix of the data.

5. The method according to claim 1, wherein the first preamble and the data respectively occupy different time slots, at least one time slot occupied by the data reserves a guard interval, and the reserved guard interval of the data is used to be multiplexed by the UE other than the first UE.

6. A method for information transmission, comprising:
    receiving, by an access network entity, a first random access request sent by a first user equipment (UE), wherein the first random access request carries a first preamble and data; and
    transmitting, by the access network entity, a random access response to the first UE according to the first random access request,
    wherein at least one time slot occupied by the first preamble reserves a guard interval, and the reserved guard interval of the first preamble is used to be multiplexed by a UE other than the first UE,
    wherein the first preamble and the data are time division multiplexed, and a total power for transmitting each of data symbols of the data is the same as a total power for transmitting any other one of the data symbols of the data; or
    the first preamble and the data are frequency division multiplexed, and a power of the first preamble is the same as a total power for transmitting data symbols of the data.

7. The method according to claim 6, further comprising:
    calculating, by the access network entity, a channel estimation result according to the first preamble; and
    detecting and demodulating the data by the access network entity according to the channel estimation result.

8. The method according to claim 7, wherein a length of a cyclic prefix of the data is less than a length of a cyclic prefix of the first preamble, and after the receiving, by the access network entity, the first random access request sent by the first UE, the method further comprises:
    detecting, by the access network entity, the first preamble to obtain a timing offset between the first UE and the access network entity; and
    determining, by the access network entity, a Fast Fourier Transformation (FFT) processing window for transmitting each of the data symbols of the data according to the timing offset; and/or
    wherein the method further comprises: receiving, by the access network entity, a second random access request sent by a second UE, the second random access request comprising a second preamble, and the first random access request and the second random access request being frequency division multiplexed.

9. The method according to claim 6, wherein in a case that the first preamble and the data are frequency division multiplexed,
the first preamble and the data adopt different subcarrier spacings, and a guard frequency band is comprised between a plurality of subcarrier where the first preamble is located and a plurality of subcarrier where the data is located; or
the first preamble and the data adopt a same subcarrier spacing, the data occupies a plurality of different subcarriers, the plurality of subcarriers where the first preamble is located is arranged in the center of the plurality of subcarriers where the data is located, and a guard frequency band is comprised at both the outermost sides of the plurality of subcarriers where the data is located.

10. The method according to claim 6, wherein the first preamble comprises one or more preamble sequences, and the first preamble and the data occupy one or more time slots;
the data has a multi-carrier waveform or a single-carrier waveform;
a length of the first preamble is the same as or different from a length of the data; and
a length of a cyclic prefix of the first preamble is the same as or different from a length of a cyclic prefix of the data; or
wherein the first preamble and the data respectively occupy different time slots, at least one time slot occupied by the data reserves a guard interval, and the reserved guard interval of the data is used to be multiplexed by the UE other than the first UE.

11. A user equipment (UE), comprising:
a processor, a memory and a transceiver, wherein when reading programs from the memory, the processor is configured to:
transmit a first random access request to an access network entity, wherein the first random access request carries a first preamble and data; and
receive a random access response sent by the access network entity according to the first random access request;
wherein the transceiver is configured to receive and transmit data under the control of the processor,
wherein at least one time slot occupied by the first preamble reserves a guard interval, and the reserved guard interval of the first preamble is used to be multiplexed by a UE other than the first UE,
wherein the first preamble and the data are time division multiplexed, and a total power for transmitting each of data symbols of the data is the same as a total power for transmitting any other one of the data symbols of the data; or
the first preamble and the data are frequency division multiplexed, and a power of the first preamble is the same as a total power for transmitting data symbols of the data.

12. The UE according to claim 11,
wherein a second random access request sent by a second UE and the first random access request are frequency division multiplexed, the second random access request carrying a second preamble.

13. The UE according to claim 11, wherein in a case that the first preamble and the data are frequency division multiplexed,
the first preamble and the data adopt different subcarrier spacings, and a guard frequency band is comprised between a plurality of subcarriers where the first preamble is located and a plurality of subcarriers where the data is located; or
the first preamble and the data adopt a same subcarrier interval, the data occupies a plurality of different subcarriers, the plurality of subcarriers where the preamble is located is arranged in the center of the plurality of subcarriers where the data is located, and a guard frequency band is comprised at both the outermost sides of the plurality of subcarriers where the data is located.

14. The UE according to claim 11, wherein the first preamble comprises one or more preamble sequences, and the first preamble and the data occupy one or more time slots;
the data has a multi-carrier waveform or a single-carrier waveform;
a length of the first preamble is the same as or different from a length of the data; and
a length of a cyclic prefix of the first preamble is the same as or different from a length of a cyclic prefix of the data; or
wherein the first preamble and the data respectively occupy different time slots, at least one time slot occupied by the data reserves a guard interval, and the reserved guard interval of the data is used to be multiplexed by the UE other than the first UE.

15. An access network entity, comprising:
a processor, and a memory, wherein when reading programs from the memory, the processor is configured to perform steps of the method for information transmission according to claim 6.

16. The access network entity according to claim 15, wherein the processor is configured to:
calculate a channel estimation result according to the first preamble; and
detect and demodulate the data according to the channel estimation result.

17. The access network entity according to claim 16, wherein a length of a cyclic prefix of the data is less than a length of a cyclic prefix of the first preamble, and the processor is configured to:
detect the first preamble to obtain a timing offset between the first UE and the access network entity; and
determine an FFT processing window for transmitting each of the data symbols of the data according to the timing offset; and/or
wherein the processor is further configured to:
receive a second random access request sent by a second UE, the second access random access request comprising a second preamble, and the first random access request and the second random access request being frequency division multiplexed.

18. The access network entity according to claim 15, wherein in a case that the first preamble and the data are frequency division multiplexed,
the first preamble and the data adopt different subcarrier spacings, and a guard frequency band is comprised between a plurality of subcarriers where the first preamble is located and a plurality of subcarriers where the data is located; or the first preamble and the data adopt a same subcarrier spacing, the data occupies a plurality of different subcarriers, the plurality of subcarriers where the preamble is located is arranged in the center of the plurality of subcarriers where the data is located, and a guard frequency band is comprised at both the outermost sides of the plurality of subcarriers where the data is located.

19. The access network entity according to claim 15, wherein the first preamble comprises one or more preamble sequences, and the first preamble and the data occupy one or more time slots;

the data has a multi-carrier waveform or a single-carrier waveform;

a length of the first preamble is the same as or different from a length of the data; and a length of a cyclic prefix of the first preamble is the same as or different from a length of a cyclic prefix of the data; or wherein the first preamble and the data respectively occupy different time slots, at least one time slot occupied by the data reserves a guard interval, and the reserved guard interval of the data is used to be multiplexed by the UE other than the first UE.

* * * * *